United States Patent Office 3,428,519
Patented Feb. 18, 1969

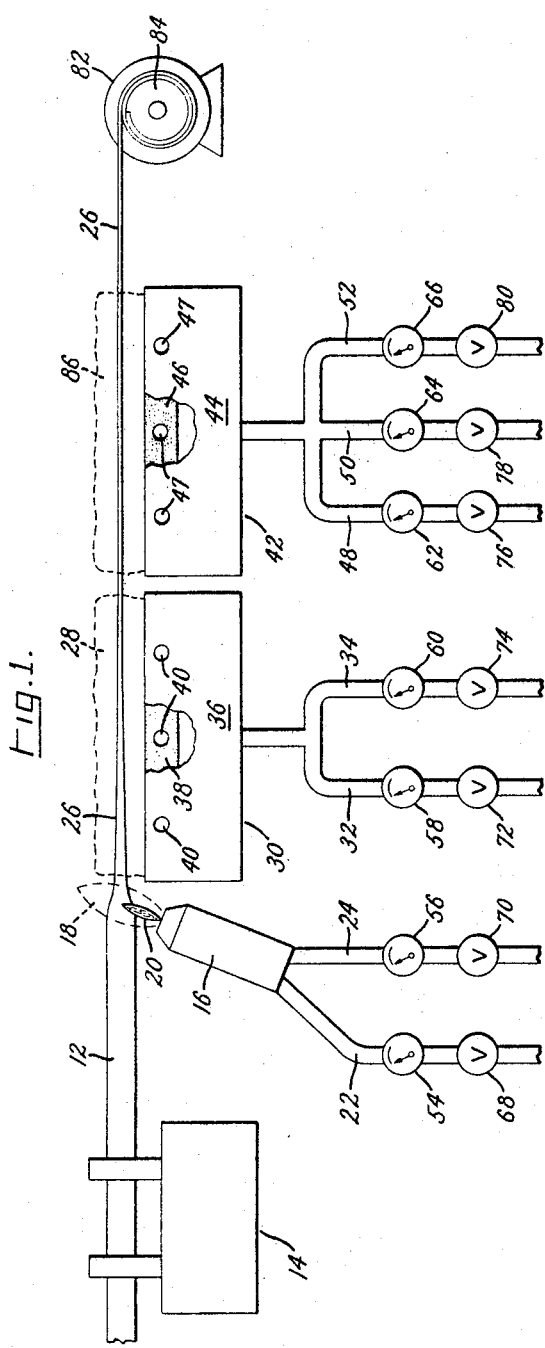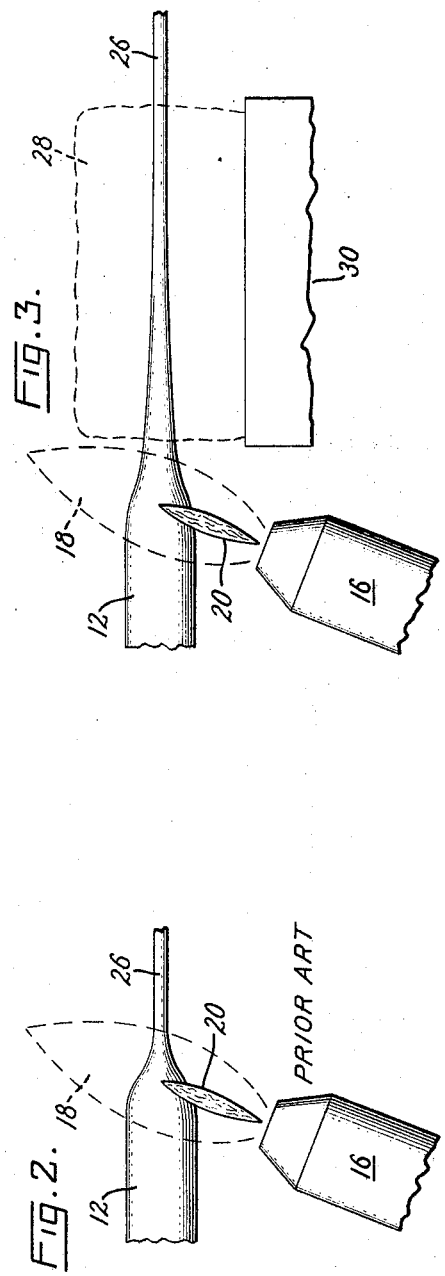

3,428,519
METHOD FOR MAKING A COATED SILICA FIBER AND PRODUCT PRODUCED THEREFROM
Carl M. Zvanut, Paoli, Pa., assignor to General Electric Company, a corporation of New York
Continuation-in-part of applications Ser. No. 376,062, June 18, 1964, and Ser. No. 518,056, Jan. 3, 1966. This application Dec. 22, 1966, Ser. No. 622,831
U.S. Cl. 161—181                5 Claims
Int. Cl. C03b 37/02; D01f 9/06

ABSTRACT OF THE DISCLOSURE

Fine vitreous fibers of highly uniform diameter are drawn from a thick rod by heating it to its softening point and drawing the fiber along a path whose temperature decreases monotonically to a value at which the fiber is hard; and then given a protective coating by passage through a fuel-rich exothermally decomposing mixture of carboniferous gas with an oxidant.

---

This invention pertains to the drawing into filaments of fibers of thermoplastic, particularly vitreous, materials, and to the coating of filaments with a pyrolytic coating. It is a continuation in part of my copending application, Ser. No. 518,056, filed Jan. 3, 1966, entitled "Fiber Production," now abandoned which is a continuation-in-part of my copending application, Ser. No. 376,062, filed June 18, 1964, entitled "Coating of Vitreous Materials."

In my earliest copending application to which reference has been made I teach the formation of fibers of vitreous material by heating a rod of such material with a melting flame sufficiently hot to render the material plastic, and drawing a filament or fiber from such plastic portion which may be described as an unconfined mass, to differentiate it from fused material confined in a crucible or pot or by the walls of a bushing. Since the effective tensile strength of such a filament is markedly reduced by surface irregularities of defects, which may be produced by handling of the filament after formation, I teach the deposition of a protecting and lubricating coating upon the filament by leading it into an exothermally reacting, or combusting, mixture including a carboniferous gas, such as acetylene, and less than a stoichiometric proportion of oxidant, such as oxygen. In its passage through this exothermally reacting region, or flame, the filament becomes coated with a pyrolytic deposit conventionally known as pyrolytic carbon. This deposit is smooth, firmly adherent, and acts to preserve the filament from accidental injury in subsequent spooling so that long lengths of filament of high and uniform strength are produced.

This procedure, which is prior with respect to the present application, is completely operative as described, and has been used to produce such coated filaments for useful purposes. However, various adjustments, such as exact location of the molten part of the rod with respect to the rod proper (which is determined by the exact positioning of the melting flame with respect to the rod), tend to be more critical than is desirable for a production process. I have therefore invented an improved process which is easier to control and which facilitates the production of thick pyrolytic coatings. Since the electrical conductivity which can be imparted to the insulating filament by the pyrolytic coating is a useful property for some purposes, the possibility of making the coating thick so that the conductivity in increased is desirable. My new process also facilitates the drawing of extremely thin filaments of uniform cross section and high tensile strength.

I have a theory or hypothesis as to the nature of my process and the reasons for its beneficial results which is consistent with my observations, and useful to that extent. Since, however, I have not undertaken a rigorous logical analysis of the theory, nor attempted to devise critical experiments to prove or disprove its validity, my references to the theory must be recognized as simply a useful tool in the explanation of my invention, and not as a basis upon whose scientific validity my invention depends.

In the drawing of filaments of thermoplastic material from an originally molten mass, there is a reduction in diameter of the filament and an increase in length, with increase in surface area. When this operation is conducted with flame heating of a material having a high softening temperature, such as silica, the hottest point of the flame interior serves to keep a portion of the material at its softening point, so it can serve as a source of fiber material. The fiber may cool somewhat in passing through the flame, being reduced in cross section during passage. However, I have found, by means to be described hereinafter, that the boundary of a flame operating in ambient air is not so cool as the interior thereof immediately adjacent to the boundary, but is hotter, presumably because the ambient oxygen combines at the boundary with residual unburned fuel. In consequence, at such boundary the partially cooled filament is suddenly heated, and stretches still more. This may result in fracture of the fiber by combined softening and drawing, or it may, because of the poorly controlled nature of the heating at the boundary, simply cause erratic variations in diameter. To eliminate this "hot spot" at the boundary of the melting flame, I provide a shield or baffle, which may include a flow of gas, which keeps ambient oxygen from reaching the melting flame boundary at that part thereof through which the path of the filament lies. Thus the filament is drawn along a path over which the temperature varies monotonically decreasing to a value sufficiently low (and the viscosity varies monotonically increasing to a value sufficiently high) that the fiber is substantially hard. The gas flow employed may be either non-reacting, as nitrogen, or may be itself a "soaking" flame of such composition that its temperature is sufficiently low to meet the criterion described. The process described yields filaments of highly uniform diameter, and consequently also permits the easy production of filaments of very small diameter.

The preserve maximum strength in freshly drawn filaments such as silica, an adherent protective coating may be applied which must be flexible and uniform, in order that it may not concentrate stress in the filament and cause premature failure. In my cited copending application, I teach passing a filament from a melting flame into the luminous part of a carbonifer-rich coating flame. I have found that by completing drawing of filament prior to entry into the coating flame, as in my present invention, I obtain superior uniform strength in the final coated product, presumably because coating deposited upon a stabilized filament surface is kept continuous, while coating deposited upon a surface still being drawn out will be cracked and thus made irregular, and caused to produce deleterious stress concentrations. I have found that the use of a horizontal surface-combustion type of burner permits a very stable flame over the entire burner surface; and this makes it possible to pass the drawn filament, still hot from the soaking flame, through the luminous part of the coating flame just above the colorless portion of the flame. Carbon deposition occurs at a maximum rate under such conditions. A further advantage of the horizontal surface-combustion type of burner is that the coating flame may be extended horizontally as far as desired, increasing the coating time (for a given speed of reeling of the fiber) and thus increasing the possible coating thickness. The use of a horizontal surface-combustion burner has thus many distinct advantages over the use of a vertical burner.

Thus an object of my invention is the improved drawing of thermoplastic material into filaments which may be of small and are in any event of uniform diameter; and another is the pyrolytic coating of filaments once formed by passing the previously heated filaments through a region of exothermally reacting gas in which the coating material is presumed not free but nascent or in unstable combination. Clearly, by achieving both of these objects, I achieve that of producing filaments, of uniform diameter which may be very small, having a highly adherent uniform pyrolytic coating; and further, that of producing such filaments which are of very high tensile strength.

For the better understanding and explanation of my invention I have provided figures of drawing in which:

FIG. 1 represents a complete apparatus for drawing and coating fibers according to my invention;

FIG. 2 represents the usual manner of drawing fine fibers using a single melting flame;

FIG. 3 represents the manner in which fine fibers are drawn in a melting flame shielded by a conjoined flame, according to my invention.

Figure 4:
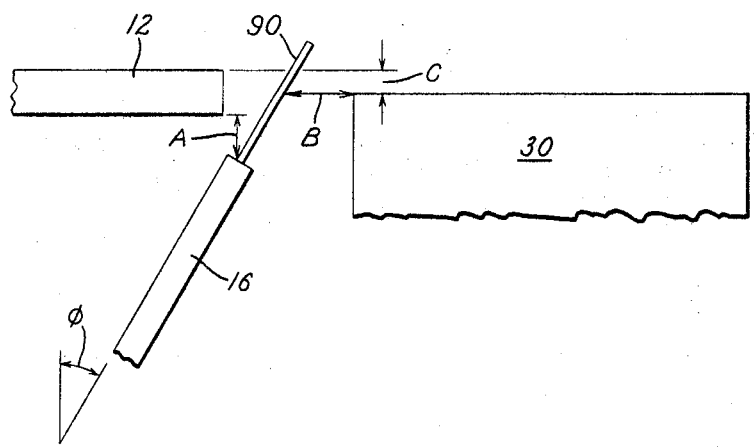
FIG. 4 represents a way of setting certain spacings in the apparatus.

FIG. 1 represents schematically a rod 12 of vitreous material, which may be silica, supported by a device for feeding the rod forward at a controlled speed, the generic numeral 14 sufficing to identify the feed mechanism, which may be any conventional motor, reduction, and linear drive combination. Oxyhydrogen torch 16 is represented as throwing a flame 18 upon the point 20 of rod 12, hose lines 22 and 24 being connected to sources of hydrogen and oxygen, respectively. The fiber 26 drawn from point 20 passes directly from the oxyhydrogen flame 18 into a soaking flame 28 which burns over porous plug burner 30, which is fed oxygen and carbon monoxide via hoses 32 and 34, respectively. This particular combination of gases is convenient in that it burns with a visible blue flame, and its burning velocity is low, which is convenient for development work. Any combination of gases which burn with a clean (i.e. not carbon-depositing) flame and can be adjusted to produce the required flame temperature by adjusting the mixture will be satisfactory; hydrogen and oxygen, and propane and oxygen, have been used with complete satisfaction. (Noncombusting gas such as nitrogen may also be used without detriment to the drawing process.) Since figure drawing conventions do not provide means for showing flames of different composition actually in contact with each other, flames 18 and 28 are represented separately; but actually flame 28 is in contact with the flame 18. Burner 30 is partly cut away to show the structure which consists of a hollow housing 36 whose upper part is stopped by porous plug 38, which is pierced by cooling water tubes 40. (This cooling water supply itself is not shown, for simplicity; running cooling water through tubes is well within the scope of known art.) Porous plug 38 is made of sintered metal powder or shot pressed and sintered to itself and sintered, brazed, or otherwise in good thermal contact with tubes 40. Copper-brazed copper shot is particularly desirable, because of its convenient high-temperature properties; and the edge of the burner 30 nearest to burner 16 may conveniently be protected by flame-sprayed ceramic material from impingement of flame 20. Combustible mixture is provided by entry of gases through hoses 32 and 34 into the lower part of housing 36. A similar porous plug burner 42 lies immediately beside burner 30, provided with housing 44, porous plug 46, and gas hose connections 48, 50, 52. A variety of gas mixtures may be applied to burner 42; air, oxygen, and acetylene, which the acetylene present preferably in concentrations from five to twenty-five times the stoichiometric is satisfactory.

Auxiliary devices represented in FIG. 1 are as follows: gas flow meters 54, 56, 58, 60, 62, 64, 66, and flow control valves 68, 70, 72, 74, 76, 78, and 80 are located, respectievly, in hose lines 22, 24, 32, 34, 48, 50, and 52. Motor 82 has mounted on its shaft a spool 84 for reeling up the fiber 26 after it has passed through the various production and treatment steps.

To facilitate understanding of the reason for certain procedures in connection with the apparatus of FIG. 1, it is useful to compare the prior art as represented by FIG. 2 with the detail of the applicant's procedure as represented by FIG. 3. The prior art (FIG. 2) provides merely a flame 18 of one gas composition and the vitreous rod 12 is heated by its impingement at end 20, so that a fiber 26 may be drawn off. My procedure in the embodiment represented by FIG. 3 provides a first flame 18 impinging on rod 12 at end 20; and a second flame 28 which overlaps flame 18, so that the vitreous material 12 when drawn out into fiber 26 moves into a region which, while still well above room temperature, is cooler than flame 18. It is noticeable that the addition of a second burner 36 adjacent to the melting flame 18 produced by the first burner or torch 16 permits production of filaments 26 of extremely uniform diameter. One would normally assume that a flame like 18 in FIG. 2 will have a high temperature region at the interface between the inner core of oxidant and the outer flow of reducing fuel gas into which it is injected; and that the temperature along any path leading from such high temperature region to outside the flame will decrease monotonically with distance. The first assumption is true, but the second is not. To determine the temperature distribution from the center to the outside of the flame 18 (burning alone, in air, as in FIG. 2), I inserted in the flame a small diameter tungsten wire which I had coated with powdered silica. From the brightness of the glowing wire I could see that the highest temperature occurred in the central part of the flame, and decreased toward its edge. But at the edge or outer surface of the flame the wire again glowed brightly; and, when the wire was removed from the flame and examined, the silica coating was found to have melted at that point. Apparently there is a final "burst" of combustion which produces a high temperature where the remaining excess of reducing fuel meets the oxygen of the ambient air, so that any impression or assumption that the temperature in such a flame is monotone decreasing from its center to outside the flame is false.

However, when torch 16 was placed adjacent to burner 30, as represented in FIG. 3, and burner 30 was supplied with a carbon monoxide-oxygen mixture, there was no indication of a localized "hotspot" at the boundary of flame 18.

I then tried the experiment of replacing the fuel and oxidant mixture fed to burner 36 of FIG. 1 with nitrogen, and again inserted my freshly coated wire into the flame 18 so it extended across the top of burner 36, with nitrogen flowing around it. I now found that no bright spot appeared on the wire at the boundary of flame 18, nor was the silica melted at the point. The left edge of burner 36 was actually in contact with the outer boundary of flame 18 during this test. It appears that by excluding atmospheric oxygen from the boundary of flame 18, I prevented the rise in temperature at the edge of flame 18 which I had previously observed. I then attempted to draw a filament 26 from the rod 12, feeding burner 36 with nitrogen and adjusting its position so that its left edge was actually in contact with the boundary of flame 18 and so that its top was very close to filament 26. Under these conditions I was able to draw fine filaments with very little variation in diameter for long periods of time.

This does not indicate that it is not desirable to provide a flame over burner 30. Despite the possibility of drawing filaments of uniform diameter by passing inactive gas through burner 30, for the coating operation it is desirable to have the filament 26 hot when it enters the exothermally reacting mixture at 86.

It should be observed that it appears to be necessary, to obtain benefits of my invention, to provide some shield or barrier, to the atmospheric oxygen, which will remain sufficiently fixed in location to prevent the entrainment of atmospheric air into the melting flame 18 in such wise as to produce a hot spot in the vicinity of the somewhat thin, partially drawn, part of filament 26. (Entrainment which may occur close to the central part 20 of flame 18 will merely extend the volume of rod 12 which is softened by flame portion 20.) Thus a second flame ostensibly like 28, but extending out from a comparatively remote conventional burner and liable to displacement by vagrant drafts will not furnish protection of the boundary of flame 18 from atmospheric air; but the water cooled burner 36, even when it discharges only inert gas, will furnish such protection, since it can extend as a barrier into flame 18.

FIG. 4 represents a simple means I have found useful for setting the relative positions of torch 16, burner 30, and rod 12. The centerline of torch 16 is established by inserting in its orifices a drill rod of the largest diameter which will readily enter. The angle $\phi$, the angle between the axis of torch 16 and the vertical, is conveniently set at about nine degrees. Rod 12 is 0.190 inch in diameter, preferably of bubble-free vitreous material such as silica (since any bubbles included in the material being melted and drawn tend to produce faults in the drawn fiber). The letter dimensions A, B, and C are respectively, the vertical distance from the lower boundary of 12 to the side of drill rod 90, the horizontal distance from the upper edge of burner 30 to the nearest side of rod 90, and the vertical distance from the upper boundary of rod 12 to the top surface of burner 30.

Using A=0.38 inch, B=0.130 inch, C=0.150 inch, a torch 16 orifice of 0.098 inch bore, fed a mixture of 3.8 parts of hydrogen to one part oxygen, and drawing at the proper speed to produce filaments of approximately 0.0004 inch diameter, filaments were produced whose coefficient of variation was 4.8 percent.

Using A=0.50 inch, B=0.130 inch and 0.200 inch, a torch 16 orifice of 0.098 inch bore, fed a mixture of 3 parts of hydrogen to one part oxygen, and drawing at the proper speed to produce filaments of approximately 0.001 inch diameter, filaments were produced whose coefficient of variation was 3.0 percent.

Using A=0.50 inch, B=0.120 inch, C=0.219 inch, a torch 16 orifice of 0.098 inch bore, fed a mixture of 2.6 parts hydrogen to one part oxygen, and drawing at the proper speed to produce filaments of approximately 0.0007 inch diameter, filaments were produced whose coefficient of variation was 1.2 percent.

Other diameters produced under similar conditions, and their coefficients of variation (based in each case upon 18 or more samples measured) were

| Diameter in inches: | Coefficient of variation in percent |
|---|---|
| 0.00018 | 4.9 |
| 0.00021 | 4.7 |
| 0.00027 | 3.1 |
| 0.00038 | 2.7 |

For comparison, a filament of 0.0004 inch diameter was drawn by the method of the prior art, FIG. 2, and showed a coefficient of variation (for more than 50 samples) of 20 percent.

The term "coefficient of variation," while used in standard texts, is here defined: Given a series of N observations, of values $X_1 \ldots X_i \ldots X_n$ which have an arithemetic mean, or average value, $X_{av}$ the coefficient of variation is expressed by $$1/X_{av} \times \sqrt{(X_1-X_{av})^2+\ldots+(X_i-X_{av})^2+\ldots+(X_n-X_{av})^2/N}$$

Since its numerical value is ordinarily well below unity, it may conveniently be expressed in percent.

Drawing speeds in this art are high; in the practice of my invention, I have employed speeds of 3,000 to 7,500 feet per minute, and higher speeds are feasible. The uniformity of diameter produced by the use of my invention makes it possible to continue the drawing operation without interruption for indefinitely long periods, and thus to produce filaments literally miles in length with diameter everywhere accurately controlled. This characteristic distinguishes the product of my invention from the shorter lengths of comparatively uniform diameters which could be culled from the longer lengths of the prior art by selecting only those parts which had the desired diameter. The speed of drawing is related to the raate at which the flame 18 melts the rod; clearly, if the rod is not melted so rapidly as it is attempted to draw it off into filaments, the fiber will break at the rod. With the particular apparatus, I have employed, the consumption of hydrogen expressed in terms of cubic feet of hydrogen consumed per cubic inch of silica melted and drawn may range from twenty to sixty with satisfactory results.

Some examples of duration of the drawing operation which I have conducted are the following:

0.0002 inch diameter at 6,000 feet per minute for over five minutes 0.0004 inch diameter at 6,000 feet per minute for over 15 minutes 0.0007 inch diameter at 3,000 feet per minute for 15 minutes In each instance, the apparatus was stopped deliberately because it was considered that the continuity of operation had been proved by production of continuous lengths from five to fifteen miles long.

The actual mechanism of carbon deposition is necessarily the subject of hypothesis. Mere soot formation is not desired, or even tolerable, because that produces a loose deposit which is readily rubbed off, and is not sufficiently impervious to contribute any protection to the fiber. It is necessary that a carboniferous gas be caused to yield carbon in a dense, closely adherent form. High temperature is required; and, to insure that not all the carbon produced is oxidized away, it is necessary that any oxidant present be in less than the stoichiometric equivalent of all the reducing material present. Why an exothermal reaction is necessary (as I have found) is not certain; the mere increase in temperature which it affords can be produced by other means, such as external heating, which has been found ineffective to produce the desired deposit. It appears that the destruction of the hydrocarbon atom incidental to oxidation leaves some fragmented radicals which can lay down adherent dense carbon of the kind desired. This hypothesis seems consistent with the observation that the best deposition occurs when the hot fiber passes through the luminous part of the flame immediately above the clear region of the flame. Presumably exothermal reaction is beginning in the clear region, and it is in the edge of the adjacent luminous region that a high concentration of "nascent" carbon exists. This admitted speculation seems consistent with observation.

Coating speeds may be as high as drawing speeds provided sufficient exposure to the coating flame 86 is provided to give the desired thickness of carbon coating. In general, the higher the temperature of the acetylene flame, the faster the coating is deposited; but this increased temperature is obtained by increasing the acetylene flow, so that more carboniferous material is fed in a given time. It may, therefore, be basically the increased availability of carbon which primarily increases the deposition rate. The tensile strength of fibers appears not to be critically affected by the deposition process, tensile strengths of variously coated silica samples ranging from 400,000 to 540,000 pounds per square inch. These samples were "soaked" from 2,100 to 2,800 degrees Fahrenheit, then coated at speeds from 3,000 to 7,500 feet per minute in acetylene flames whose temperatures ranged from 2,400 to 2,600 degrees Fahrenheit, extending either four or eight inches horizontally along the path of the filament.

For example, soaking at 2,100 degrees and coating at 6,000 feet per minute for eight inches and 2,600 degrees gave a coating thickness of 190 angstroms and tensile strength of 492,000 pounds per square inch. Soaking at 2,300 degrees, with all other conditions the same, gave a coating thickness of 165 angstroms and tensile strength of 493,000 pounds per square inch. Soaking at 2,100 degrees and coating at 3,000 feet per minute for only four inches at 2,600 degrees gave a coating thickness of 160 angstroms and a tensile strength of 450,000 pounds per square inch. Soaking at 2,850 degrees and coating at 2,600 degrees at 6,000 feet per minute over four inches yielded 160 angstroms and 420,000 pounds per square inch.

It is desirable to provide a general interpretation of the various temperatures I have here quoted for silicia. So far as the melting and soaking flames are concerned, their temperature is significant in their production of particular viscosity ranges in the vitreous material. In "Properties of Selected Commercial Glasses," Corning Glass Works, Corning, New York (copyright 1961) at p. 14 thereof, a curve of viscosity against temperature for fused silica appears, together with definitions of the various temperatures or "points" used in glass working to define the characteristics of a glass. The initial or melting temperature used to render the material stock plastic is the softening point, or slightly above; that is the temperature at which the glass viscosity is $10^{7.6}$ poises or slightly less. The soaking temperature, which may conveniently range from 2,100 to 2,800 degrees F. lies slightly below the softening point and extends down to approximately the annealing point (which for silica is about 2,000 or 2,100 degrees F.) Viscosity at the annealing point is $10^{13}$ poises; that is far greater than the viscosity at which the filament may be drawn. Thus the drawing may occur in the immediate vicinity of the molten region on rod 21, and the passage over most of flame 28 be at temperatures such that the filament 26 is, colloquially expressed, "hard." It must be recognized that there may, however, be some advantage in the avoidance of extreme thermal shock by maintaining the filament 26 above the annealing temperature during its brief time of passage through flame 28; but for materials for which this is not true, it is feasible to reduce the horizontal length of flame 28 as much as is consistent with its performance of the necessary shielding of flame 18 from ambient oxygen, and of the maintenance of the required filament temperature for the subsequent coating operation. Since it is primarily the control of temperature gradients and adjustment of viscosity that is essential, rather than the use of a particular temperature, it is evident that low-melting glasses may be drawn according to my teaching, although it would not, of course, be possible to coat by the method I have taught any glass of such low melting point that it would melt at the temperature required for the coating process.

I claim:
1. The method of producing a fine fiber of vitreous material consisting principally of silica which comprises:
    (a) providing a flame of a mixture of a reducing fuel and oxygen to melt a portion of an unconfined mass of vitreous material consisting principally of silica;
    (b) providing in contact with the side flame a flow of gas nonreactive with the said flame, at a temperature below the melting point of the said vitreous material to exclude the entry of ambient air into the region of the said contact;
    (c) drawing a fiber of the said material from the said melted portion through the said flame directly thence through the said region of contact, directly thence through the said flow of gas, and into the ambient atmosphere.

2. The method of claim 1 in which the said fiber, after being drawn through the said flow of gas, is drawn into an exothermally reacting mixture of a carboniferous gas with less than its stoichiometric equivalent of oxygen, to produce on the said fiber a hard firmly adherent coating of pyrolytic carbon prior to being drawn out of the said mixture.

3. As a new product, a filament of fused material consisting essentially of silica of diameter less than 0.001 inch having a coefficient of variation of diameter of less than 5 percent in continuous lengths of more than a mile made by the process of claim 1.

4. The method of applying a pyrilytic carbon coating to a vitreous fiber which comprises:
    (a) passing the fiber through a clean soaking flame whose temperature is below the softening point of the fiber and above its annealing point;
    (b) passing the fiber immediately from the said soaking flame into a coating atmosphere comprising an exothermally reactive mixture of a carboniferous gas, and an oxidant gas in less than stoichiometric proportion to the reducing gases in the said atmosphere.

5. The method claimed in claim 4, in which the therein said coating atmosphere is provided by passage of the said exothermally reactive mixture through the pores of a coded porous plug.

References Cited

UNITED STATES PATENTS 3,294,503  12/1966  Machlan et al. _____ 65—1

DONALL H. SYLVESTER, *Primary Examiner.*

ROBERT LINDSAY, *Assistant Examiner.*

U.S. Cl. X.R.

65—3, 32; 117—226, 229

UNITED STATES PATENT OFFICE
CERTIFICATE OF CORRECTION

Patent No. 3,428,519 February 18, 1969

Carl M. Zvanut

It is certified that error appears in the above identified patent and that said Letters Patent are hereby corrected as shown below:

Column 8, line 10, "side" should read -- said --; same column 8, after line 50, insert the following references:

| | | | |
|---|---|---|---|
| 1,474,009 | 11/1923 | Straw | 117-46 FB |
| 1,561,561 | 11/1925 | Meloche | 117-46 FB |
| 1,635,370 | 7/1927 | Lee | 117-46 FB |
| 2,788,296 | 4/1957 | Louis | 117-46 FB |
| 3,125,428 | 3/1964 | Maczka | 117-46 CG |

Signed and sealed this 10th day of March 1970.

(SEAL)
Attest:

EDWARD M. FLETCHER, JR.
Attesting Officer

WILLIAM E. SCHUYLER, JR
Commissioner of Patents